United States Patent [19]

Cruse

[11] Patent Number: 4,615,545
[45] Date of Patent: Oct. 7, 1986

[54] CONNECT-DISCONNECT COUPLING FOR A PLURAL-PASSAGE FLUID LINE

[75] Inventor: Lee H. Cruse, Ozark, Mo.

[73] Assignee: Foster Manufacturing Company, Springfield, Mo.

[21] Appl. No.: 757,428

[22] Filed: Jul. 22, 1985

[51] Int. Cl.⁴ .............................................. F16L 41/08
[52] U.S. Cl. .................................. 285/24; 251/149.9; 285/26; 285/131; 285/138; 285/158; 285/192; 285/306; 285/315; 285/133.1
[58] Field of Search ...................... 285/24, 25, 26, 33, 285/131, 133 R, 138, 315, 316, 306, 83, 158, 192; 251/149.6, 149.9

[56] References Cited

U.S. PATENT DOCUMENTS

| | | | |
|---|---|---|---|
| 1,062,015 | 5/1913 | Lane | 285/192 |
| 2,471,796 | 5/1949 | Thomas | 417/413 |
| 2,956,586 | 10/1960 | Zeigler et al. | 285/133 R |
| 3,127,149 | 3/1964 | Cruse | 251/149.9 |
| 3,211,178 | 10/1965 | Kiszko | 137/414.04 |
| 3,477,688 | 11/1969 | Cruse | 251/149.9 |
| 3,498,647 | 3/1970 | Schroder | 285/343 |
| 3,589,673 | 6/1971 | Cruse | 251/149.9 |
| 3,809,128 | 5/1974 | Tateisi | 138/114 |
| 3,820,827 | 6/1974 | Boelkins | 285/133 R |
| 4,116,475 | 9/1978 | Glaser et al. | 285/133 R |
| 4,494,728 | 1/1985 | Cruse | 251/149.9 |

FOREIGN PATENT DOCUMENTS

| | | | |
|---|---|---|---|
| 1947230 | 4/1971 | Fed. Rep. of Germany | 285/133 R |
| 514438 | 11/1939 | United Kingdom | 285/133 R |
| 658755 | 7/1948 | United Kingdom | . |
| 829096 | 3/1955 | United Kingdom | . |
| 1034671 | 6/1966 | United Kingdom | . |
| 1360732 | 7/1974 | United Kingdom | 285/133 R |

*Primary Examiner*—Cornelius J. Husar
*Assistant Examiner*—Eric K. Nicholson

[57] ABSTRACT

A connect-disconnect coupling for a plural-passage fluid line has an outer socket which has an inner plug mounted therein; and an outer plug has an inner socket mounted in it. That inner plug includes a yieldable tube which has one end thereof in fluid-tight engagement with a partition in that outer socket; and the other end of that yieldable tube can automatically align itself with the inner socket in the outer plug as that outer plug is telescoped into that outer socket. The other end of that yieldable tube is capable of automatically returning to a position which is generally central of the outer socket even if that yieldable end had been moved all the way to one side of that outer socket.

22 Claims, 4 Drawing Figures

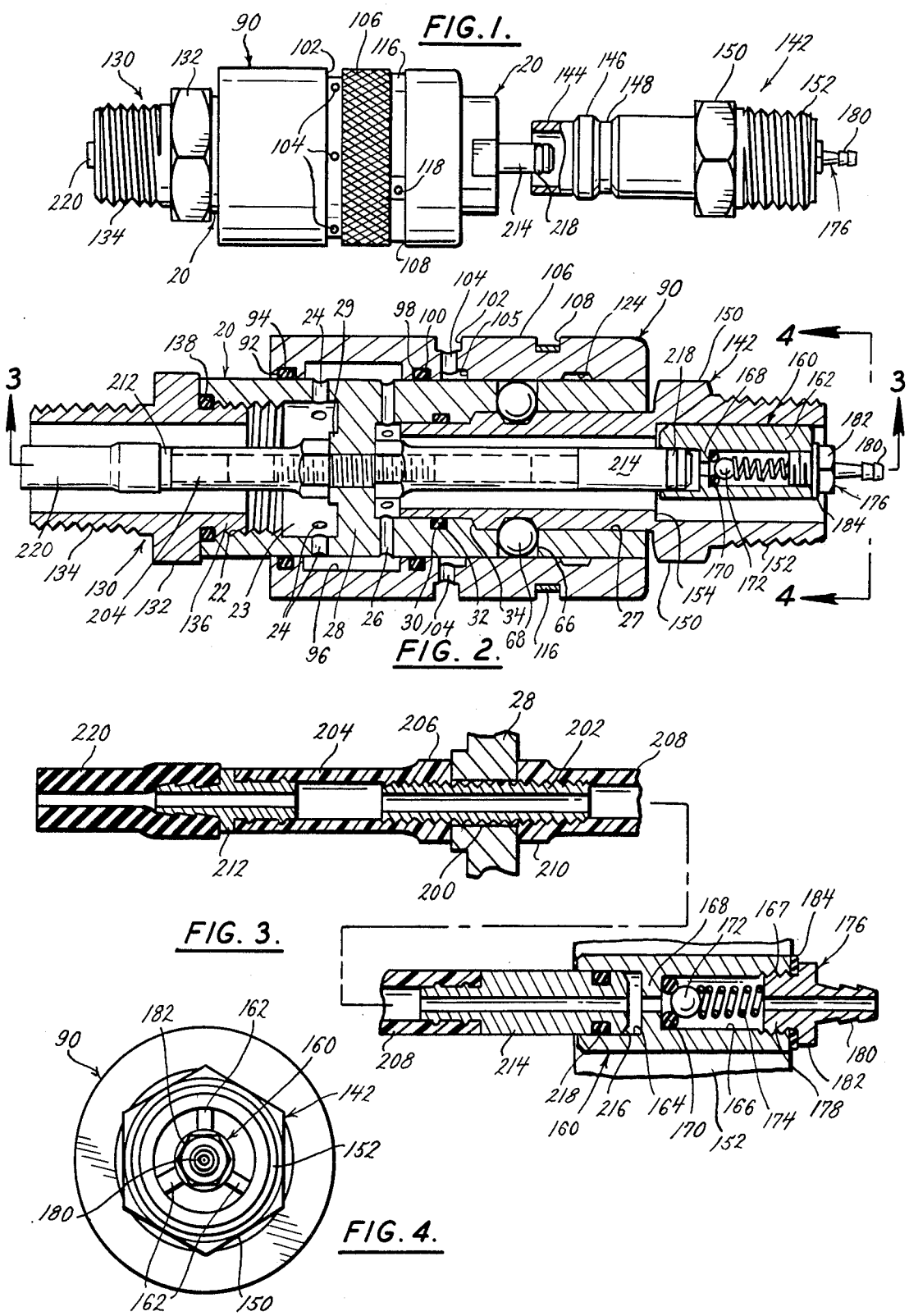

CONNECT-DISCONNECT COUPLING FOR A PLURAL-PASSAGE FLUID LINE

SUMMARY OF THE INVENTION

A connect-disconnect coupling for a plural-passage fluid line has an outer socket which supports and carries an inner plug. That outer socket has a surface which accommodates an outer plug; and that outer plug supports and carries an inner socket. Whenever the outer plug is telescoped into the outer socket, the inner plug carried by that outer socket should telescope into the inner socket carried by that outer plug. If that inner plug is precisely concentric with that surface of the outer socket which accomodates the outer plug, and if that inner socket is precisely concentric with that portion of the outer plug which telescopes into that outer socket, the inner plug will automatically telescope into the inner socket without any bending or shifting of any parts of the inner and outer sockets and plugs. However, because manufacturing tolerances and variations cannot be totally eliminated, and because connect-disconnect couplings for plural fluid lines can be exposed to rough handling, the inner plug of such a coupling may not always be precisely coaxial with the inner socket of that coupling. To enable the inner plug to telescope into the inner socket, even when that plug and that socket are not precisely coaxial, the present invention includes a relatively-stiff but flexible tube as part of that inner plug and also provides an aligning surface at the free end of that plug. That aligning surface will, as the outer socket and outer plug are being telescoped together, engage the inner socket and respond to any misalignment of the inner plug and inner socket to apply a radially-directed force to the outer end of that inner plug; and the relatively-stiff but flexible tube of that inner plug will flex sufficiently to enable the outer end of that inner plug to become precisely coaxial with, and to telescope directly into, the inner socket. As a result, the inner plug and inner socket of the coupling provided by the present invention will automatically telescope together, as the outer socket and outer plug of that coupling telescope together—even if that inner plug and inner socket are not initially precisely coaxial. It is, therefore, an object of the present invention to provide a connect-disconnect coupling for a plural-passage fluid line wherein the inner plug includes a relatively-stiff but flexible tube and also has an aligning surface at the free end thereof, so that inner plug will automatically telescope into the inner socket as the outer socket and outer plug are telescoped together—even if that inner plug and inner socket are not initially precisely coaxial.

The inner end of the relatively-stiff but flexible tube abuts one surface of a partition, within the outer socket, in such an intimate engagement that the said inner end is rigidly held against bending, shifting, skewing or tilting relative to that partition, and also is held in fluid-tight engagement with that partition. A second tube has its inner end held in such intimate engagement, with the opposite surface of that partition, that the said inner end is rigidly held against bending, shifting, skewing or tilting relative to that partition, and also is held in fluid-tight engagement with that partition. As a result, those tubes are able to coact with a passage through that partition to constitute parts of an inner passageway for fluids that does not need O-rings or other seals to prevent the loss of fluid therefrom. Also, those tubes are effectively isolated from each other; so that if one of those tubes must be flexed or bent, the flexing or bending of that tube cannot cause any bending, shifting, skewing or tilting of any part of the other tube. It is, therefore, an object of the present invention to provide a connect-disconnect coupling for a plural-passage fluid line wherein tubes have the inner ends thereof rigidly secured to a partition within the outer socket of that connector to enable that partition and those tubes to constitute parts of an inner passageway that can prevent the loss of fluid therefrom, and also to keep any bending or flexing of either of those tubes from causing any bending, shifting, skewing or tilting of any part of the other of those tubes.

The inner ends of the first and second tubes are telescoped over a conduit which is disposed within a hole through the partition in the outer socket of the connector. Those inner ends are sealed to that conduit in fluid-tight relation; and those inner ends also abut the opposite faces of the partition in such intimate engagement as to provide fluid-tight seals between that conduit and that hole. As a result, the inner ends of those tubes directly coact with the partition and with the conduit within the hole in the partition to isolate the fluid in the inner passage through the coupling from fluid in the outer passage of that coupling, and vice versa. It is, therefore, an object of the present invention to provide a connect-disconnect coupling for a plural-passage fluid line wherein a conduit is disposed within a hole in a partition in an outer socket, and wherein the inner ends of tubes telescope over that conduit to provide fluid-tight seals between themselves and that conduit and also between that conduit and that hole.

Although the tube which is part of the inner plug is yieldable and bendable, that tube is stiff enough to normally hold a metal tip in the outer end thereof substantially concentric with the axis of the outer socket. The material of which that tube is made is sufficiently resilient to permit that metal tip to be moved transversely across the full radial extent of the outer passageway defined by the outer socket without assuming a "set", and then automatically return to its substantially concentric position. It is, therefore, an object of the present invention to provide a tube which is part of the inner plug of a connect-disconnect coupling and which is made of a material that is relatively stiff but is sufficiently resilient to permit a metal tip in the outer end of that tube to be moved throughout the full radial extent of the outer passageway defined by that coupling and thereafter automatically restore itself to its normal position wherein it is substantially concentric with the axis of that coupling.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

BRIEF DESCRIPTION OF DRAWINGS

FIG. 1 is a partially broken away side elevational view of one preferred embodiment of connect-disconnect coupling, for a dual-passage fluid line, that is made in accordance with the principles and teachings of the present invention;

FIG. 2 is a vertical section, on a larger scale, through the coupling of FIG. 1 after the sections of that coupling have been telescoped into assembled relation;

FIG. 3 is a sectional view, on a still larger scale, which is taken along a plane indicated by the line 3—3 in FIG. 2; and FIG. 4 is an end elevational view, on the scale of FIG. 2, which is taken along a plane indicated by the line 4—4 in FIG. 2.

DETAILED DESCRIPTION OF PREFERRED EMBODIMENT

Referring to the drawing in detail, the numeral 20 generally denotes a tubular socket which constitutes the female member of a preferred embodiment of connect-disconnect coupling for a dual-passage fluid line. An internal thread 22 is provided in the left-hand end of that socket; and that internal thread constitutes part of the inner surface of a cavity 23 which extends inwardly from the left-hand end of that socket and which has the inner end thereof defined by a partition 28. A cylindrical boss 29 extends into that cavity from the left-hand face of that partition, as shown particularly by FIGS. 2 and 3. A number of radially-directed ports 24 are formed in the wall of cavity 23 adjacent the inner end of that cavity.

The numeral 27 denotes a cavity which is coaxial with the cavity 23 but which is separted from that cavity by the partition 28. The cavity 27 extends to the right-hand end of the socket 20, as shown by FIG. 2. A number of radially-directed ports 26 extend through the wall of cavity 27. The partition 28 prevents direct communication between the cavities 23 and 27.

The numeral 30 denotes an annular groove in the inner surface of the cavity 27; and that groove is disposed to the right of the ports 26. An O-ring 32 is disposed within that annular groove; and the diameter of an unstressed transverse section of that O-ring is greater than the depth of the groove 30. As a result, the inner surface of that O-ring normally projects into the cavity 27. An inclined annular shoulder 34 constitutes part of the inner surface of the cavity 27; and that shoulder is disposed to the right of the annular groove 30, as shown by FIG. 2. That shoulder interconnects a large diameter, right-hand portion of cavity 27 with a small diameter left-hand portion of that cavity.

The numeral 66 denotes a plurality of radially-directed, circumferentially-spaced recesses in the wall of socket 20; and those recesses are disposed to the right of annular groove 30, as shown by FIG. 2. The inner ends of those recesses are smaller in cross-section than the rest of those recesses. Balls 68 are disposed in those recesses; and the inner surfaces of those balls can extend inwardly of the cylindrical inner surface of the right-hand portion of cavity 27, as shown by FIG. 2. However, the reduced diameter inner ends of recesses 66 will limit the extent to which those balls can move inwardly of that cylindrical inner surface. The diameter of each ball 68 is greater than the wall thickness of the right-hand portion of cavity 27, as shown by FIG. 2. The socket 20 is machined from a single piece of metal.

The numeral 90 generally denotes a sleeve which is dimensioned to telescope over, and to closely encircle, the outer surface of socket 20. An annular groove 92 is provided at the inner surface of that sleeve adjacent the left-hand end of that sleeve, as shown by FIG. 2. An O-ring 94 is disposed within that groove; and that O-ring will be compressed, and hence will provide a fluid-tight seal between sleeve 90 and socket 20, whenever that sleeve is telescoped over that socket. A wide annular recess 96 is formed in the inner surface of sleeve 90 a short distance to the right of the annular groove 92; and that recess has an axial dimension which enables it to simultaneously communicate with ports 24 and the ports 26, as indicated by FIG. 2. However, the axial dimension of annular recess 96 is short enough so that recess can be wholly displaced away from the ports 26. The numeral 98 denotes an annular groove which is formed in the inner surface of sleeve 90 and which is disposed a short distance to the right of annular recess 96. An O-ring 100 is disposed within the groove 98; and that O-ring will be compressed, and hence will provide a fluid-tight seal between sleeve 90 and socket 20, whenever that sleeve is telescoped over that socket. An annular groove 102 is provided in the external surface of the sleeve 90 at a point which is displaced a short distance to the right of the annular groove 98, as shown by FIG. 2. A number of circumferentially-displaced, radially-directed holes 104 are provided in the sleeve 90; and the outer ends of those holes communicate with the annular groove 102, as shown by FIG. 2. The inner ends of those holes communicate with an annular groove 105 in the inner surface of the sleeve 90.

An annular knurled surface 106 is provided at the exterior of the sleeve 90; and that knurled surface is disposed to the right of the external annular groove 102. That annular knurled surface helps the user of the connect-disconnect coupling to apply reciprocative and rotative forces to that sleeve. An annular groove 108 is formed in the outer surface of the sleeve 90 adjacent the right-hand end of the knurled portion 106.

The numeral 116 denotes a split-ring spring which is disposed within the annular groove 108. A pin 118, which is pressed into a recess, not shown, in the sleeve 90 at the bottom of the annular groove 108, is secured to that spring intermediate the ends of that spring to prevent circumferential shifting of that spring relative to the sleeve 90. The numeral 124 denotes an annular groove in the inner surface of sleeve 90; and that groove is displaced to the right of the external annular groove 108, as shown by FIG. 2. Annular groove 124 is dimensioned to accomodate the outer surfaces of the balls 68 which are held within the recesses 66 of socket 20.

The foregoing specifically-identified and numbered components preferably are, with the exception of the partition 28, of the outer ends of the ports 26, and of the groove 105, identical to the similarly-numbered components of the connector of my Pat. No. 4,437,647. Moreover, those components plus the other components, not shown, of socket 20 and of sleeve 90 which are not shown in the drawing, but which are identical to the corresponding components in said patent, constitute the outer socket of the connect-disconnect coupling for a dual-passage fluid line provided by the present invention.

The partition 28 of the present invention differs from the identically-numbered partition in said patent by having a hole 200 therein; and that hole is un-threaded, and preferably is concentric with the axis of the outer socket. A threaded conduit 202 is dimensioned to readily slide into the un-threaded hole 200 in partition 28. A tube 204 with a wrench-receiving surface 206 on the right-hand end thereof has an internal thread in the right-hand end thereof which enables that right-hand end to be threaded onto the left-hand end of the conduit 202. The numeral 208 denotes a tube which has a wrench-receiving surface 210 on the left-hand end thereof; and that left-hand end has an internal thread which enables that left-hand end to be threaded onto the right-hand end of the conduit 202. The tubes 204 and 208 preferably are made from nylon; because nylon is relatively stiff and yet can be flexed, is resilient and tends to return to its normal position after being bent away from that position, and tends to swell or "grow" after it has been machined.

The numeral 212 denotes a hose fitting with a barb-equipped left-hand end and with a rib-equipped right-hand end. That rib-equipped right-hand end is pressed into the left-hand end of the tube 204; and the material which defines the inner surface of that tube will yield to accommodate those ribs, but will thereafter form an essentially-permanent fluid-tight engagement with that hose fitting. The barb-equipped left-hand end of the fitting 212 will fit into the right-hand end of a short length 220 of flexible tubing. The numeral 214 denotes a cylindrical fitting with a small-diameter rib-equipped left-hand end and with an annular groove in the right-hand end. Also, that right-hand end has a chamfer 216 which constitutes an aligning surface. An O-ring 218 is disposed within the annular groove in the right-hand end of the fitting 214; and the unstressed thickness of that O-ring is greater than the depth of that annular groove.

The numeral 130 in FIGS. 1 and 2 generally denotes a supply fitting which has a wrench-receiving shoulder 132, a threaded left-hand end 134, and a threaded right-hand end 136. An O-ring 138 is telescoped over the threaded right-hand end 136 and is moved into abutting engagement with the right-hand face of the wrench-receiving shoulder 132. The threaded right-hand end 136 mates with the internal thread 22 of the cavity 23 in the socket 20. When that threaded right-hand end is rotated into position within that internal thread, the O-ring 138 will be compressed; and it will provide a fluid-tight seal between the fitting 130 and the outer socket 20. The left-hand threaded end 134 will receive a threaded fitting on the free end of an outer hose which constitutes part of a dual-passage fluid line. A barb-equipped fitting, not shown, on the inner hose of that dual-passage fluid line will be inserted into the left-hand end of the length 220 of flexible tubing. The flexibility of the length of tubing 220 will enable the barb-equipped fitting on the inner hose of the dual-passage fluid line to be telescoped into the left-hand end of that tubing length—even if that barb-equipped fitting is not initially in register with that left-hand end.

The rib-equipped small diameter left-hand end of the fitting 214 will be pressed into the right-hand end of the tube 208. The inner surface of that tube will yield to accommodate the ribs on that left-hand end, and will thereafter provide a substantially permanent connection between that tube and that fitting.

The fitting 212 will be assembled with the tube 204 before that tube is assembled with the conduit 202 and partition 28. Similarly, the fitting 214 will be assembled with the tube 208 before that tube is assembled with that conduit and that partition. Either of the tubes 204 and 208 can be assembled with conduit 202 before that conduit is disposed within the opening 200 in the partition 28. That tube will be threaded onto that conduit until the wrench-receiving end of that tube is in a position which is very close to, but slightly short of, the position which that wrench-receiving end will eventually assume when it is finally set in position on that conduit. Thereafter, the other end of that conduit will be telescoped through the opening 200 in the partition 28; and then the internally threaded inner end of the other tube will be threaded onto the other end of that conduit. While a wrench holds the wrench-receiving surface of the tube, which was first threaded onto conduit 202, a wrench will be applied to the wrench-receiving surface of the other tube and will be used to rotate that other tube. That other tube will be rotated until the wrench-receiving end thereof engages the adjacent face of partition 28, or of boss 29, and causes the wrench-receiving end of the other tube to be drawn into engagement with the opposite face of that partition. Rotative forces will continue to be applied to the wrench-receiving surfaces of the two tubes until the wrench-receiving ends of those tubes are in such intimate abutting engagement with the partition 28 or boss 29 that fluid-tight engagement is provided between those tubes and partition 28. Simultaneously, the tubes will be given a fluid-tight engagement with the conduit 202. Not only will the engagement between the wrench-receiving end of each of the tubes 204 and 208 and partition 28 be sufficiently intimate to provide a fluid-tight seal, but that engagement will be so intimate that it will rigidly connect each tube to that partition, thereby preventing any shifting, tilting or skewing of the inner end of that tube or of the conduit 202 relative to partition 28. As a result, the tubes 204 and 208 are effectively isolated from each other; and any flexing or bending of either of those tubes can not cause any bending, shifting, skewing or tilting of the other of those tubes. Moreover, no bending or flexing of either of those tubes could cause any bending, shifting, skewing or tilting of the conduit 202.

Where the device or the dual-passage fluid line, that is to be connected to the left-hand end of the connect-disconnect coupling of the present invention, has a male thread rather than a female thread, the supply fitting 130 and the length 220 of flexible tubing will not be used. In such event, the right-hand end of the inner passage of that dual-passage fluid line will be telescoped directly onto the barbed end of fitting 212. Also, the O-ring 138 will be carried at the left-hand end of that male thread. The supply fitting 130 may be made in different sizes; and hence the length 220 of flexible tubing may have an axial dimension which is different from that shown in FIGS. 2 and 3. However, that length of flexible tubing will always have a sufficiently long axial dimension to cause the left-hand end of that length of flexible tubing to be exposed. Because the determination of whether or not a length 220 of flexible tube will be used, and the determination of what axial dimension that length of tubing will have, cannot be made until the customers' requirements are known, the length 220 of flexible tubing is not telescoped onto the barbed end of fitting 212 until the size of the supply fitting 130 is specified.

The threads which are formed in the inner surfaces of the tubes 204 and 208, adjacent the wrench-receiving ends of those tubes, are formed with taps or threading tools that are customarily used to form internal threads which are intended to accomodate the external thread on conduit 202. Where those tubes are made from nylon, the swelling or "growth", which automatically occurs after machining operations, will cause those internal threads to provide tighter-than-normal engagements with the external thread on conduit 202. Those engagements will be so intimate that they will provide fluid-tight seals between those tubes and that conduit.

Further, because the nylon of the tubes 204 and 208 is yieldable, the wrench-receiving ends of those tubes can be compressed into such intimate engagement with partition 28 or with boss 29 that no O-rings are needed to form liquid-tight seals between conduit 202 and partition 28 or between those tubes and that partition. This means that by using nylon in making the tubes 204 and 208, the present invention obviates the initial costs, the installation costs, and the replacement costs of O-rings or other seals between partition 28, conduit 202 and those tubes.

The numeral 142 generally denotes the outer plug of the connect-disconnect coupling provided by the present invention. That plug has a small diameter left-hand end 144 which is dimensioned to telescope into the cavity 27 in the socket 20 and also is dimensioned to pass through and to compress the O-ring 32. The numeral 146 denotes an annular rib at the right-hand end of the small diameter left-hand portion 144; and the numeral 148 denotes an annular groove to the right of that annular rib. A wrench-receiving surface 150 is disposed an appreciable distance to the right of the annular groove 148, as shown particularly by FIG. 1. A threaded right-hand end 152 extends to the right from the wrench-receiving surface 150. The plug 142 is tubular, as shown particularly by FIG. 2; and it has a shoulder 154 at the interior thereof.

The numeral 160 denotes a cylinder with three angularly-displaced spacing ribs 162 thereon; and those ribs are shown particularly by FIG. 4. A recess 164 is provided in the left-hand end of that cylinder; and that recess constitutes the inner socket of the connect-disconnect coupling provided by the present invention. That recess is positioned relative to the shoulder 154, and it is dimensioned, to fully and readily receive the right-hand end of the fitting 214 which is carried by the free end of the tube 208; and the O-ring 218, that is carried by the groove adjacent the right-hand end of that fitting, will be compressed as it enters that recess. The chamfer 216 will act as an aligning surface which can provide automatic shifting of the fitting 214 into registry with the recess 164. The numeral 166 denotes a recess in the right-hand end of the cylinder 160; and a partition 168 with a centrally-disposed port is provided intermediate those recesses. An internal thread 167 is provided at the right-hand end of the recess 166.

The numeral 170 denotes an O-ring which is disposed within the recess 166 immediately adjacent the port in the partition 168. A ball 172 is urged into engagement with that O-ring by a helical compression spring 174 which has the left-hand end thereof engaging that ball. The right-hand end of that spring abuts the left-hand face of a hose fitting 176 which has a threaded left-hand end 178 that mates with the internal thread 167 at the right-hand inner surface of the recess 166. A barbed right-hand end 180 for the fitting 176 will be telescoped into the free end of the inner hose of the other section of the dual-passage fluid line with which the connect-disconnect coupling of the present invention is used. That barb will provide a substantially permanent connection between the fitting 176 and that hose. The ball 172, O-ring 170 and spring 174 will act as a check valve for the fluid in that hose.

The numeral 182 denotes a wrench-receiving surface on the fitting 176; and the numeral 184 denotes a gasket which is interposed between that wrench-receiving surface and the right-hand end of the cylinder 160. That gasket will be compressed sufficiently to provide a fluid-tight seal between the cylinder 160 and the fitting 176.

If a section of a dual-passage fluid line is made so the ends of the inner and outer hoses thereof are precisely concentric, and if the left-hand end of length 220 of flexible tubing is precisely concentric with supply fitting 130, no shifting of that left-hand end will be required as the barb in the end of the inner hose is telescoped into that left-hand end. Also, if a further section of that dual-passage fluid line is made so the ends of the inner and outer hoses thereof are precisely concentric, and if the hose fitting 176 is precisely concentric with thread 152, there will be no need for the inner hose to shift as the barbed right-hand end 180 of that fitting is telescoped into that inner hose. All of this means that if the ends of the inner and outer hoses of the dual passage fluid line are precisely concentric, if the free end of length 220 of flexible tubing is precisely concentric with supply fitting 130, and if fitting 176 is precisely concentric with thread 152, the inner and outer hoses of one section of the dual passage fluid line can easily be assembled with tubing length 220 and fitting 130, and the inner and outer hoses of the other section of that dual passage fluid line can easily be assembled with fitting 176 and thread 152. If, however, the inner hose that is to be connected to the length 220 of flexible tubing is not precisely concentric with the outer hose of that section of dual passage fluid line, or if that tubing length is not precisely concentric with fitting 130, the left-hand end of that length of flexible tubing can be shifted radially of the axis of fitting 130 to enable the barbed end of the inner hose to telescope into that left-hand end. Similarly, if the inner hose that is to be connected to the barbed end 182 of fitting 176 is not precisely concentric with the outer hose of that section of dual passage fluid line, or if that barbed end is not precisely concentric with the thread 152, the end of the inner hose can be shifted radially to enable that inner end to telescope over that barbed end.

If the fitting 214 is precisely concentric with cavity 27, and if the recess 164 is precisely concentric with the small diameter left-hand end 144 of outer plug 142, the right-hand end of that fitting will automatically enter that recess—without any flexing or bending of tube 208—as the plug 142 is telescoped into the socket 20. However, if the recess 164 is not precisely concentric with the small diameter left-hand end 144 of plug 142, or if the fitting 214 is not precisely concentric with the cavity 27, the aligning chamfer 216 on the right-hand end of that fitting will engage the portions of the left-hand end of cylinder 160 which surround that recess and will automatically guide that right-hand end into that recess—the tube 208 flexing or bending sufficiently to permit that right-hand end to become precisely coaxial with, and to enter, that recess. The tube 208 is sufficiently flexible to keep it from being stressed beyond its elastic limit, and thereby taking a "set" even if the fitting 214 were to be moved far enough radially to engage the inner surface of the cavity 27. As a result, the material of that tube will not take a "set" when it is moved radially through any much smaller distance which might be needed to make it engage the inner surface of plug 142. This is desirable in freeing the tube 208 from any and all stresses which could cause it to take a "set" that would keep it from tending to return to its normal position.

As the fitting 214 is telescoped into the recess 164, the O-ring 218 will be compressed and will provide a fluid-tight seal between that fitting and that recess. That fluid-tight engagement will coact with the fluid-tight engagement between the length 220 of flexible tubing and the barb in the end of the inner hose of the left-hand section of the dual-passage fluid line, with the fluid-tight connection between the wrench-receiving ends of the tubes 204 and 208 with conduit 202 and with partition 228, and with the fluid-tight engagement between barbed end 180 and the inner hose of the right-hand section of the dual-passage fluid line to positively confine fluid within the inner passage, and to keep that fluid from escaping into the outer passage, and vice versa.

When the plug 142 is separated from the socket 20, the tube 208 will hold the fitting 214 concentric with the cavity 27, if that fitting and cavity are normally precisely concentric and if the recess 164 is precisely concentric with the small diameter end 144 of plug 142. However, the tube 208 will move back to its normal unstressed position, and will also move the fitting 214 back to its normal position, if that tube had to be bent or flexed away from its normal unstressed position as the fitting 214 was telescoped into recess 164 in cylinder 160. No matter how many times the socket 20 receives, and is then freed from, the plug 142, the tube 208 will always hold the aligning surface 216 on the fitting 214 either precisely concentric with recess 164, or close enough to that recess to permit automatic telescoping of that recess over the right-hand end of that fitting.

When the connect-disconnect coupling of the present invention has been machined, assembled and tested, light-opaque shields will be used to close the light-hand end of fitting 130 and the right-hand end of cavity 27. Those shields will fully protect the tubes 204 and 208 from any light-induced degrading to which they might otherwise be subject. Those light-opaque shields will be removed before a hose fitting is threaded onto the thread 134 of fitting 130 and before the outer plug 142 is telescoped into the cavity 27.

Where the length 220 of flexible tubing is secured to the left-hand end of the tube 204, that tube does not have to be flexible or bendable; and that tube could be made sufficiently thick-walled to be fully resistant to bending or flexing, or it could have the conduit 202 extending throughout the major portion of the length thereof to keep it from bending or flexing. Also, if the inner hose, of the left-hand section of dual-passage fluid line, was to be telescoped directly into the fitting 212, and if the flexibility of that inner hose was to be relied upon to compensate for any initial misalignment of that hose and of that fitting, the tube 204 could be made fully resistant to bending or flexing. However, if the fitting 212 was intended to telescope into the end of such an inner hose, and if the tube 204 was to be relied upon to compensate for any initial misalignment of that hose and of that fitting, that tube should be sufficiently flexible and bendable to facilitate that telescoping. Importantly, the rigid securements of that tube, of the tube 208, and of the conduit 202 to the partition 28 will keep any flexing or bending of tube 204 from causing even the slightest bending or flexing of tube 208.

Each of the tubes 204 and 208 performs a number of functions. Each provides a fluid-tight seal with the partition 28, provides a fluid-tight seal with the conduit 202, helps provide such a rigid securement of conduit 202 and of the inner ends of those tubes to partition 28 that there can be no shifting, bending, tilting or skewing of any kind between that conduit and that partition or between either of those inner ends and that partition, helps provide such a rigid engagement between its inner end and the partition 28 that no bending or flexing thereof can cause a flexing or bending of any part of the other tube, and vice versa, and tends to hold the free end thereof concentric with the axis of the coupling. The tube 208 performs two additional functions, namely, it will automatically flex and bend to accomodate any misalignment of the inner plug and inner socket as the outer plug and outer socket are telescoped together, and it will automatically return the fitting 214 to its normal position as that outer plug and outer socket are moved apart.

The tubes 204 and 208 are shown as being identical in all respects, and this is desirable; because it reduces the number of kinds of parts that are needed to make the coupling, and it frees the assembler from the need of selecting one kind of tube for the left-hand end of conduit 202 and of selecting a different kind of tube for the right-hand end of that conduit. However, if desired, the tubes 204 and 208 could be made so they were not identical; but the tube 208 would have to be made so it could flex or bend to compensate for any initial misalignment of fitting 214 and recess 164.

The coupling shown in the drawing has an outer fluid passageway and an inner fluid passageway. If desired, the coupling of the present invention could be made with an outer fluid passageway and with more than one inner passageway.

Whereas the drawing and accompanying description have shown and described a preferred embodiment of the present invention, it should be apparent to those skilled in the art that various changes may be made in the form of the invention without affecting the scope thereof.

What I claim is:

1. A connect-disconnect coupling for a plural-passage fluid line which comprises an outer socket and an outer plug which can be connected together to define an enclosure and to provide an outer passageway for a fluid and which can have outer fluid lines connected thereto, an inner socket and an inner plug which can be connected together to provide an inner passageway for a second fluid and which can have inner fluid lines connected thereto, and means mounting said inner socket and said inner plug at least partially within said enclosure defined by said outer socket and said outer plug so said inner socket and said inner plug will be connected together to complete said inner passageway whenever said outer socket and said outer plug are connected together to complete said outer passageway, said inner socket and said inner plug keeping fluid passing through said inner passageway from mixing with fluid passing through said outer passageway whenever said inner socket and said inner plug are connected together, said outer socket and said outer plug and said outer fluid lines enclosing and protecting said inner socket and said inner plug and said inner fluid lines whenever said outer socket and said outer plug are connected together, said means including a partition which extends tranversely of said outer passageway and which has a hole through it, and a flexible tube that has an inner end and an outer end and that has said inner end thereof in communication with said hole in said partition and that has said outer end thereof free to serve as a radially-displaceable part of said inner plug, said tube flexing intermediate said inner and outer ends thereof to automatically enable said outer end thereof to move radially and thereby dispose said inner plug in engagement with a complementary surface in said inner socket as said outer plug and said outer socket are connected together if said outer end of said tube and said inner socket are not aligned as said outer socket and said outer plug are connected together, said inner end of said tube being rigidly held against movement or shifting, and also being held in fluid-tight relation, relative to said hole in said partition.

2. A connect-disconnect coupling as claimed in claim 1 wherein a metal tip is provided for said outer end of said tube to serve as the free end of said inner plug, and wherein said metal tip has a self-aligning surface thereon to facilitate said automatic flexing of said tube, intermediate said inner and outer ends thereof, as said inner plug engages said complementary surface in said inner socket as said outer socket and said outer plug are connected together.

3. A connect-disconnect coupling as claimed in claim 1 wherein a conduit is disposed within said hole in said partition, and wherein said inner end of said tube yields as it is telescoped over one end of said conduit and also yields as it is moved into abutting engagement with said partition, thereby providing fluid-tight seals between itself and said conduit and between itself and said partition.

4. A connect-disconnect coupling as claimed in claim 1 wherein a second tube is disposed at the opposite side of said partition and has an inner end in communication with said hole in said partition and has an outer end free to be connected to one of said inner fluid lines, and wherein said inner end of said second tube is rigidly held against movement or shifting, and also is held in fluid-tight relation, relative to said hole in said partition.

5. A connect-disconnect coupling as claimed in claim 1 wherein a conduit is disposed within said hole in said partition, wherein said inner end of said tube yields as it is telescoped over one end of said conduit and also yields as it is moved into abutting engageemnt with said partition, thereby providing fluid-tight seals between itself and said conduit and between itself and said partition, wherein a second tube is disposed at the opposite side of said partition and has an inner end that yields as it is telescoped over the other end of said conduit and also yields as it is moved into abutting engagement with said partition, thereby providing fluid-tight seals between itself and said other end of said conduit and between itself and said partition.

6. A connect-disconnnect coupling as claimed in claim 1 wherein a conduit is disposed within said hole in said partition, wherein said inner end of said tube yields as it is telescoped over one end of said conduit and also yields as it is moved into abutting engagement with said partition, thereby providing fluid-tight seals between itself and said conduit and between itself and said partition, wherein said abutting engagement between said partition and said inner end of said tube helps hold said conduit against any and all movement relative to said partition or relative to said hole in said partition, wherein said outer end of said tube has a metal tip thereon, and wherein those portions of said tube which are intermediate said conduit and said metal tip provide all of the bending of said tube which is needed to enable said tip to move radially of said coupling and thereby automatically move into alignment with said complementary surface in said inner socket as said outer socket and said outer plug are connected to complete said outer passageway.

7. A connect-disconnect coupling as claimed in claim 1 wherein a conduit is disposed within said hole in said partition, wherein said conduit is threaded, wherein the inner surface of said inner end of said tube yields as it is threaded onto the thread of said conduit, and wherein said inner end of said tube yields as it is moved into engagement with said partition and is thereafter held in fluid-tight engagement with said partition by the interaction of said thread on said conduit with said inner surface of said inner end of said tube.

8. A connect-disconnect coupling as claimed in claim 1 wherein a conduit is disposed within said hole in said partition, wherein said inner end of said tube yields as it is telescoped over one end of said conduit and also yields as it is moved into abutting engagement with said partition, thereby providing fluid-tight seals between itself and said conduit and between itself and said partition, and wherein said tube is made from a material that tends to "grow" or swell after it is machined, thereby providing an assured fluid-tightness of the seals between said inner end of said tube and said conduit and between said inner end of said tube and said partition.

9. A connect-disconnect coupling as claimed in claim 1 wherein a conduit is disposed within said hole in said partition, wherein said inner end of said tube yields as it is telescoped over one end of said conduit and also yields as it is moved into abutting engagement with said partition, thereby providing fluid-tight seals between itself and said conduit and between itself and said partition, and wherein a second tube has an inner end that yields as it is telescoped over the other end of said conduit and also yields as it is moved into abutting engagement wih said partition, thereby providing fluid-tight seals between itself and said conduit and between itself and said partition.

10. A connect-disconnect coupling for a plural-passage fluid line which comprises an outer socket and an outer plug which can be telescoped together along a predetermined axis to provide an outer passageway for a fluid and which can have outer fluid lines connected thereto, an inner socket and an inner plug which can be telescoped together along said predetermined axis to provide an inner passageway for a second fluid and which can have inner fluid lines connected thereto, a partition that is within and transverse of said outer socket and that has a passage through it and that holds said inner plug at least partially within said outer socket, and means mounting said inner socket at least partially within said outer plug, said inner plug and said inner socket being telescoped together to complete said inner passageway whenever said outer socket and said outer plug are telescoped together to complete said outer passageway, said inner socket and said inner plug keeping fluid passing through said inner passageway from mixing with fluid passing through said outer passageway whenever said inner socket and said inner plug are connected together, said outer socket and said outer plug and said outer fluid lines enclosing and protecting said inner socket and said inner plug and said inner fluid lines whenever said outer socket and said outer plug are connected together, said inner plug including a relatively-stiff, moderately-bendable tube that has one end thereof rigidly held against movement relative to said partition and in communication with said passage through said partition, said tube having the other end thereof displaced from said partition and said tube being bendable intermediate said inner and other ends thereof so said other end thereof is able to move transversely of said outer passageway, said tube bending to enable said inner plug to automatically engage a complementary surface in said inner socket as said outer plug and said outer socket are telescoped together if said other end of said tube and said inner socket are not aligned as said outer socket and said outer plug are telescoped together, said inner socket including a recess that is fixedly mounted in said outer plug so it is parallel to said predetermined axis.

11. A connect-disconnect coupling as claimed in claim 10 wherein said one end of said tube abuts, and forms a fluid-tight seal with, said partition.

12. A connect-disconnect coupling as claimed in claim 10 wherein said one end of said tube telescopes over one end of a conduit which is disposed within said passage through said partition, and wherein said one end of said tube forms a fluid-tight seal with said one end of said conduit and also forms a fluid-tight seal between itself and said partition.

13. A connect-disconnect coupling as claimed in claim 10 wherein said one end of said tube telescopes over one end of a conduit which is disposed within said passage through said partition, wherein said one end of said tube forms a fluid-tight seal with said one end of said conduit and also forms a fluid-tight seal between itself and said partition, and wherein said tube is formed from a material that experiences a moderate "growth" or swelling after it is machined, and thereby assures a very effective fluid-tight seal between said one end of said tube and said conduit and between said one end of said tube and said partition.

14. A connect-disconnect coupling as claimed in claim 10 wherein a conduit is disposed in said passage through said partition and has a thread on each end thereof, wherein said tube has rotation-resisting surfaces on the exterior thereof and has one end thereof formed to be threaded onto the thread at one end of said conduit, wherein a second tube has rotation-resisting surfaces on the exterior thereof and has one end thereof formed to be threaded onto the thread at the other end of said conduit, and wherein said one ends of said tubes are threaded onto said threads on said conduit until said one ends of said tubes abut the opposite faces of said partition to provide fluid-tight seals between said partition and said one ends of said tubes.

15. A connect-disconnect coupling as claimed in claim 10 wherein a conduit is disposed in said passage through said partition and has a thread on each end thereof, wherein said tube has rotation-resisting surfaces on the exterior thereof and has one end thereof formed to be threaded onto the thread at one end of said conduit, wherein a second tube has rotation-resisting surfaces on the exterior thereof and has one end thereof formed to be threaded onto the thread at the other end of said conduit, wherein said one ends of said tubes are threaded onto said threads on said conduit until said one ends of said tubes abut the opposite faces of said partition to provide fluid-tight seals between said partition and said one ends of said tubes, and wherein said one ends of said tubes abut said opposite faces of said partition so firmly that they hold said one ends of said tube and said conduit rigidly immovable relative to said partition.

16. A connect-disconnect coupling as claimed in claim 10 wherein a conduit is disposed in said passage through said partition and has a thread on each end thereof, wherein said tube has rotation-resisting surfaces on the exterior thereof and has one end thereof formed to be threaded onto the thread at one end of said conduit, wherein a second tube has rotation-resisting surfaces on the exterior thereof and has one end thereof formed to be threaded onto the thread at the other end of said conduit, wherein said one ends of said tubes are threaded onto said threads on said conduit until said one ends of said tubes abut the opposite faces of said partition to provide fluid-tight seals between said partition and said one ends of said tubes, wherein said one ends of said tubes have diameters which are substantially larger than the diameter of said passage through said partition, whereby said one ends of said tubes encircle and project outwardly beyond the periphery of said passage whenever said one ends of said tubes are in abutting relation with said partition to provide fluid-tight seals between said partition and said conduit.

17. A connect-disconnect coupling as claimed in claim 10 wherein said other end of said tube has a tip with a self-aligning surface thereon, wherein said partition holds said one end and said other end of said tube in general registry with a recess which is to receive said other end of said tube as said outer plug is being telescoped into said outer socket to complete said outer passageway, wherein said self-aligning surface on said tip can tend to guide said other end of said tube toward full registry with said recess and said tube can bend to permit said aligning surface to guide said outer end of said tube in full registry with said recess even if said recess is out of register with said tip as said outer plug is being telescoped into said outer socket to complete said outer passageway, and wherein said tube will promptly move said other end of said tube back into general registry with said one end of said tube as said outer plug is separated from said outer socket to interrupt said outer passageway.

18. A connect-disconnect coupling as claimed in claim 10 wherein a second tube has one end thereof rigidly held against movement relative to said partition and in communication with said passage through said partition, said second tube having the other end thereof displaced from said partition and having a readily-flexible length of tubing secured thereto, and projecting therefrom.

19. A connect-disconnect coupling as claimed in claim 10 wherein said one end of said tube telescopes over one end of a conduit which is disposed within said passage through said partition, wherein said one end of said tube forms a fluid-tight seal with said one end of said conduit and also forms a fluid-tight seal between itself and said partition, wherein a second tube has one end thereof telescoped over the other end of said conduit, wherein said one end of said second tube forms a fluid-tight seal with said other end of said conduit and also forms a fluid-tight seal with said partition, wherein said securement of said one ends of said tubes to said partition is so rigid that no bending of either of said tubes could cause any portion of said conduit or any portion of the other of said tubes to move or bend, thereby keeping the bending of either of said tubes as it is being aligned with a complementary portion of said inner passageway from changing the initial position of the other end of the other of said tubes with said passage through said partition.

20. A method of mounting a conduit within an opening in a partition in a connect-disconnect coupling and of providing fluid-tight seals between said conduit and said partition which comprises selecting a tube of yieldable, non-metallic material with one end having an outer diameter substantially larger than the maximum transverse dimension of said opening, causing said one end of said tube to yield and telescoping said one end of said tube over one end of said conduit in a fluid-tight engagement and forcing said one end of said tube against said partition with sufficient force to cause said one end of said tube to yield and thereby form said fluid-tight engagement to provide one of said fluid-tight seals between said conduit and said partition, selecting a second tube of yieldable, non-metallic material with one end having an outer diameter substantially larger than the maximum transverse dimension of said opening, causing said one end of said second tube to yield and telescoping said one end of said second tube over the other end of said conduit in a fluid-tight engagement and forcing said one end of said second tube against said partition with sufficient force to cause said one end of said second tube to yield and thereby form said fluid-tight engagement to provide the other of said fluid-tight seals between said conduit and said partition, and causing said one ends of said tube to close the entire spaces between the exterior of said conduit and the periphery of said opening to automatically provide said fluid-tight seals between said conduit and said partition.

21. A method as claimed in claim 20 wherein said inner ends of said tubes fixedly define an axis, and wherein said tubes are of a material that yields sufficiently to permit said other ends of said tubes to move radially of said axis while said inner ends of said tubes continue to define said axis.

22. A method as claimed in claim 20 wherein said materials for said tubes are selected to be materials which "grow" or swell after they are machined, whereby said tubes will provide assured fluid-tightness for the said fluid-tight provided thereby.

* * * * *